United States Patent
Tokunaga et al.

(10) Patent No.: US 7,963,316 B2
(45) Date of Patent: Jun. 21, 2011

(54) SEALING STRUCTURE OF A ROTATION UNIT AND AIR CONDITIONING APPARATUS HAVING THE SAME

(75) Inventors: Takahiro Tokunaga, Kosai (JP); Koichi Ito, Handa (JP); Yoshio Miyata, Nagoya (JP); Nobuyuki Hashimura, Tokai (JP); Akihisa Kurokawa, Kariya (JP)

(73) Assignees: Denso Corporation, Kariya (JP); Tokai Riki Mfg. Co., Ltd, Obu (JP)

( * ) Notice: Subject to any disclaimer, the term of this patent is extended or adjusted under 35 U.S.C. 154(b) by 1134 days.

(21) Appl. No.: 11/651,840

(22) Filed: Jan. 10, 2007

(65) Prior Publication Data
US 2007/0181773 A1 Aug. 9, 2007

(30) Foreign Application Priority Data

Jan. 12, 2006 (JP) ................................ 2006-004764
Sep. 8, 2006 (JP) ................................ 2006-244039

(51) Int. Cl.
*B60H 3/00* (2006.01)
*B61D 27/00* (2006.01)
*F28D 11/00* (2006.01)
*F28F 5/00* (2006.01)
*F28F 7/00* (2006.01)

(52) U.S. Cl. ................. 165/42; 165/76; 165/79; 165/86
(58) Field of Classification Search ............... 165/41, 165/42, 43, 44, 76, 79, 86
See application file for complete search history.

(56) References Cited

U.S. PATENT DOCUMENTS

| 5,170,841 | A | * | 12/1992 | Briet | ............................... | 165/76 |
| 7,284,595 | B2 | * | 10/2007 | Maeda et al. | ................... | 165/42 |
| 2006/0005959 | A1 | | 1/2006 | Maeda et al. | | |

FOREIGN PATENT DOCUMENTS

| JP | 2001-246921 | 9/2001 |
| JP | 2003-130044 | 5/2003 |

OTHER PUBLICATIONS

Office action dated Feb. 8, 2011 in corresponding Japanese Application No. 2006-244039.

* cited by examiner

*Primary Examiner* — Ljiljana (Lil) V Ciric
(74) *Attorney, Agent, or Firm* — Harness, Dickey & Pierce, PLC

(57) ABSTRACT

An air conditioning apparatus has a case, a heat exchanger rotatable about a rotation axis in the case, and a pipe unit in communication with the heat exchanger. The pipe unit has a first section fixed to the case and a second section coaxially coupled to the first section. The second section is coupled to the heat exchanger and rotatable with the heat exchanger. The first section has a first annular portion, a second annular portion, a cylindrical portion, and a support member. The second section has a flange portion disposed between the first annular portion and the support member. An O-ring is disposed in a groove provided by the first annular portion and the cylindrical portion, and is in contact with a surface of the first annular portion and the flange portion in a direction parallel to the rotation axis.

7 Claims, 6 Drawing Sheets

SEALING STRUCTURE OF A ROTATION UNIT AND AIR CONDITIONING APPARATUS HAVING THE SAME

CROSS REFERENCE TO RELATED APPLICATION

This application is based on Japanese Patent Applications No. 2006-4764 filed on Jan. 12, 2006 and No. 2006-244039 filed on Sep. 8, 2006, the disclosures of which are incorporated herein by reference.

FIELD OF THE INVENTION

The present invention relates to a sealing structure of a rotation unit having an O-ring between two members that are rotatable relative to each other and an air conditioning apparatus having the sealing structure.

BACKGROUND OF THE INVENTION

In a vehicle air conditioning apparatus, the temperature of air to be blown into a passenger compartment of a vehicle is generally controlled by adjusting an air mixing ratio of the volume of cool air to the volume of heat air by an air mixing door. In such an air mixing type air conditioning apparatus, it is proposed to adjust the air mixing ratio by a rotational operation of a heater core without using the air mixing door. For example, the heater core is rotationally moved so as to control the volume of cool air bypassing the heater core. In a maximum cooling operation, the heater core is for example moved to a position where the heater core does not disturb the flow of the cool air.

Also, a compact pipe coupling structure that defines passages through which an internal fluid of a heater core flows and allows the rotational operation of the heater core is proposed in Japanese Patent Publication No. 2006-44636 (US 2006/0005959 A1). As shown in FIG. 7, the pipe coupling structure is constructed of a coaxial double pipe unit 616 including a fixed member 616a and a rotation member 616b. The fixed member 616a is fixed to an air conditioning case 11. The rotation member 616b is coupled to the fixed member 616a, but is rotatable about a rotation axis A. The rotation member 616b is further coupled to a heater core 615 and rotatable with the heater core 615.

The fixed member 616a and the rotation member 616b coaxially form the passages. The internal fluid as a heat source, such as a hot water, flows in and out of the heater core 615 through the passages. The fixed member 616a and the rotation member 616b are sealed by an O-ring 635. For example, the O-ring 635 is interposed between an inner circumferential wall of the fixed member 616a and an outer circumferential wall of the rotation member 616b. Namely, the O-ring 635 is compressed in a direction perpendicular to the rotation axis A of the rotation member 616b.

In this sealing structure, however, if the heater core 615 is subjected to a load F, an axis of the rotation member 616b is displaced from an axis of the fixed member 616a. At this time, a compression ratio of the O-ring 635 is uneven along its circumference. As a result, the internal fluid is likely to leak at a position where the compression ratio is the smallest.

SUMMARY OF THE INVENTION

The present invention is made in view of the foregoing matter, and it is an object of the present invention to provide a sealing structure of a rotation unit capable of maintaining sealing.

It is another object of the present invention to provide an air conditioning apparatus having a sealing structure capable of reducing leakage of fluid.

According to an aspect of the present invention, a sealing structure of a rotation unit has a first member, a second member, and an O-ring. The first member defines a first axis. The second member defines a second axis. The first member and the second member are substantially coaxial and at least one of the first member and the second member rotates about its respective axis.

The first member has a flange portion having a first surface extending in a direction perpendicular to the first axis. The second member has a second surface extending in a direction perpendicular to the second axis. The O-ring is disposed between and in contact with the first surface of the first member and the second surface of the second member. The O-ring has a cross-section in which a dimension in a direction parallel to the first axis is smaller than a dimension in a direction perpendicular to the first axis.

The sealing structure further has a movable range regulating part that reduces relative displacement of at least one of the first and second members away from the alignment within a predetermined range. Further, the O-ring has a cross-sectional shape in which a first dimension in a direction parallel to the rotation axis is larger than a second dimension in a direction perpendicular to the rotation axis.

In the above construction, the O-ring is held in a condition compressed in a direction parallel to the first and second axes by the first and second surfaces, which extend in the direction perpendicular to the first and second axes. Further, the relative displacement of at least one of the first and second members is reduced within a predetermined range by the movable range regulating part. Thus, the O-ring will not be compressed in the direction perpendicular to the first and second axes even when the first axis and the second axis are relatively displaced. Accordingly, it is less likely that the O-ring will be unevenly compressed in the direction perpendicular to the first and second axes. Therefore, the first member and the second member are appropriately sealed.

According to a second aspect of the present invention, an air conditioning apparatus has a case defining a space through which air flows, a heat exchanger disposed in the case for performing heat exchange between the air and a fluid flowing therein. The heat exchanger is disposed rotatable about a rotation axis. The air conditioning apparatus further has a pipe unit in communication with the heat exchanger and through which the fluid flows.

The pipe unit has a first section and a second section coaxially coupled to each other. The first section is fixed to the case and the second section is connected to the heat exchanger and rotatable with the heat exchanger about the rotation axis. The first section has a first wall and a second wall opposed in a direction parallel to the rotation axis. The second section of the second pipe has a flange portion extending in a direction perpendicular to the rotation axis. The flange portion is disposed between the first wall and the second wall of the first section.

The air conditioning apparatus further has an O-ring disposed between and in contact with the flange portion and the first wall of the first section. Also, the O-ring has a cross-section in which a dimension in a direction parallel to the rotation axis is smaller than a dimension in a direction perpendicular to the rotation axis.

Accordingly, the O-ring is compressed in the direction parallel to the rotation direction. As such, even if the rotation axis of the second section is displaced from the axis of the first section, a compressed condition of the O-ring will not be changed. Therefore, it is less likely that the compression ratio of the O-ring will be uneven in its circumferential direction. Further, the flange portion is held between the first wall and the second wall in the axial direction through the O-ring. Therefore, it is possible to control a minimum compression ratio of the O-ring. Accordingly, the sealing between the first section and the second section improves, and leakage of the fluid reduces.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EXAMPLE EMBODIMENTS

First Embodiment

Figure 1:
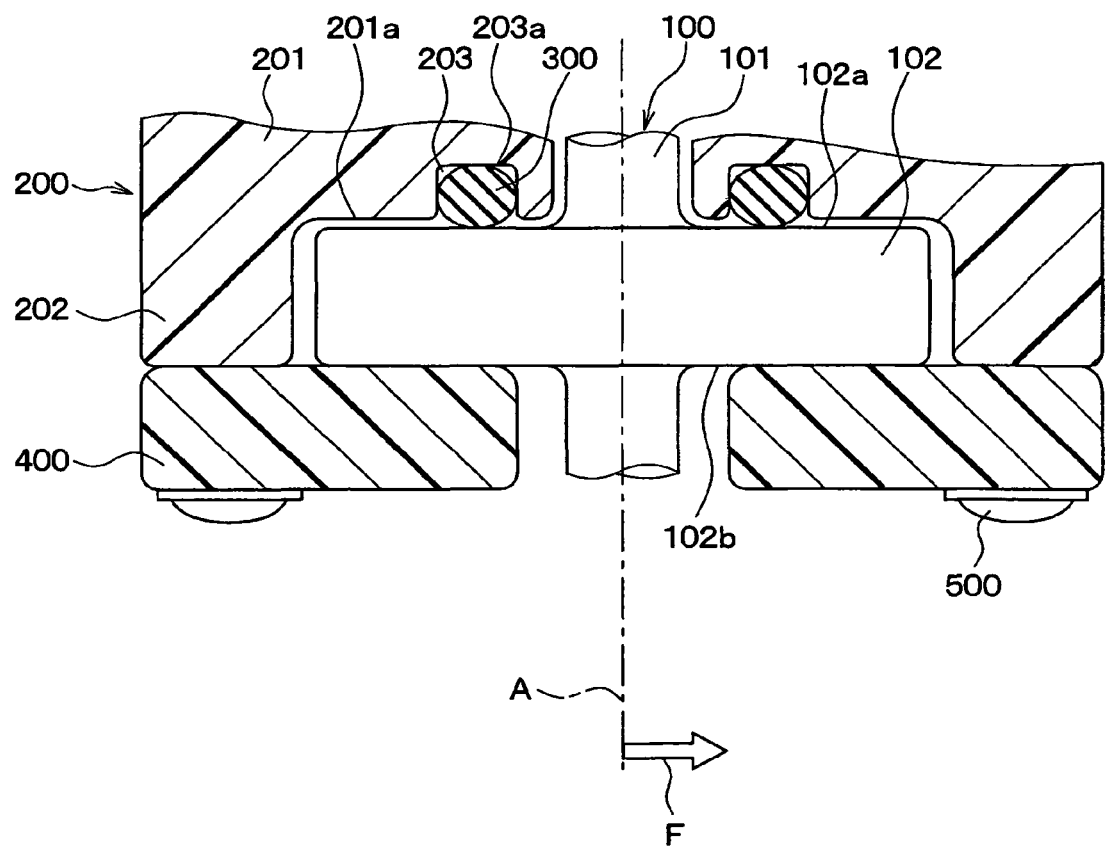
FIG. 1 is a schematic cross-sectional view of a sealing structure of a rotation unit according to a first embodiment of the present invention.

A first embodiment of a sealing structure of a rotation unit will be described with reference to FIG. 1. As shown in FIG. 1, the rotation unit has a rotation member 100 as a first member and a fixed member 200 as a second member. An O-ring 300 is disposed between the rotation member 100 and the fixed member 200.

The rotation member 100 is rotatable about a rotation axis A. The rotation member 100 has a shaft portion 101 having a columnar or cylindrical shape and a flange portion 102. The shaft portion 101 extends along the rotation axis A. The flange portion 102 radially outwardly expands from the shaft portion 101. In other words, the flange portion 102 has a disc shape and is perpendicular to the rotation axis A. The rotation member 100 is made of a resin, such as POM (polyacetal) or PBT (polybutylene terphthalate), without including glass fiber.

The fixed member 200 is for example fixed to an object such as a case defining a space therein. The fixed member 200 is made of a resin such as POM with glass fiber or PBT with glass fiber. The fixed member 200 has a main portion 201 and a cylindrical portion 202. The main portion 201 surrounds the shaft portion 101 of the rotation member 100. In other words, the main portion 201 has a hole. The shaft portion 101 of the rotation member 100 extends through the hole of the main portion 201. As such, the fixed member 200 and the rotation member 100 are disposed such that an axis of the fixed member 200 and the rotation axis A of the rotation member 100 are aligned.

The main portion 201 has an axial end wall 201a opposed to a first surface 102a of the flange portion 102 in a direction parallel to the rotation axis A. Hereafter, a direction parallel to or along the rotation axis A will be referred to as an axial direction. The cylindrical portion 202 projects from an outer peripheral portion of the axial end wall 201a in the axial direction. The cylindrical portion 202 has a cylindrical shape and surrounds the flange portion 102.

The axial end wall 201a is formed with a groove 203 having a continuous ring shape. The groove 203 is recessed from the axial end wall 201a in the axial direction, and has a substantially U-shaped cross-section.

The O-ring 300 is received in the groove 203. The O-ring 300 is made of an elastic material such as EPDM (ethylene-propylene-diene copolymer). The O-ring 300 has a continuous ring shape. Also, the O-ring 300 has a circular shape in a cross-section defined in the axial direction in an original condition.

The O-ring 300 is in contact with a bottom wall 203a of the groove 203 and the first surface 102a of the flange portion 102. The bottom wall 203a and the first surface 102a serve as sealing surfaces. As such, the rotation member 100 and the fixed member 200 are sealed. For example, the space defined in the object to which the fixed member 200 is fixed is fluid-tightly separated from the outside.

The bottom wall 203a of the groove 203 and the first surface 102a of the flange portion 102 are perpendicular to the rotation axis A. The O-ring 300 is compressed in the axial direction between the bottom wall 203a of the groove 203 and the first surface 102a of the flange portion 102. Thus, in a cross-section of the O-ring 300 defined in the axial direction, a dimension in the axial direction is smaller than a dimension in a direction perpendicular to the axial direction.

Therefore, even if the axis of the rotation member 100 is displaced due to a load F applied to a direction perpendicular to the rotation axis A, a compressed condition of the O-ring 300 will not change. As such, it is less likely that a compression ratio of the O-ring 300 will be uneven along its circumference. Further, since the compressed condition of the O-ring 300 is not affected by the load F, an operation force required for rotating the rotation member 100 will not increase.

Furthermore, it is constructed such that the shaft portion 101 contacts the main portion 201 if the axis of the rotation member 100 is displaced from the axis of the fixed member 200 due to the load F. In other words, the displacement of the rotation member 100 in the direction perpendicular to the rotation axis A is reduced in a predetermined range since the shaft portion 101 is brought into contact with the main portion 201, i.e., an inner wall defining the hole. As such, even if the axes of the rotation member 100 and the fixed member 200 are displaced relative to each other, the O-ring 300 will not be compressed in the direction perpendicular to the rotation axis A. Accordingly, the shaft portion 101 and the main portion 201 serve as means for regulating or reducing the movable range.

Namely, since relative displacement of the rotation member 100 and the fixed member 200 away from the alignment is reduced within a predetermined range, the axis of the rotation member 100 and the axis of the fixed member 200 are maintained in substantially alignment. Thus, it is less likely that the O-ring 300 will be unevenly compressed in a direction perpendicular to the axial direction.

At the end of the cylindrical portion 202, a support member 400 is connected with screws 500 as fixing means. The support member 400 for example has a thin disc shape and made of a resin such as POM with glass fiber and PBT with glass fiber. The support member 400 has a surface opposed to a second surface 102b of the flange portion 102 in the axial direction.

Specifically, the flange portion 102 is held between the support member 400 and the main portion 201 of the fixed member 200 through the O-ring 300 in the axial direction. In this case, in a condition that the flange portion 102 is in contact with the support member 400, a compression ratio of the O-ring 300 is at the minimum. Namely, the minimum compression ratio of the O-ring 300 is controlled by interposing the flange portion 102 between the support portion 400 and the main portion 201.

Accordingly, since the compression ratio of the O-ring 300 is maintained equally in its circumferential direction and the minimum compression ratio of the O-ring 300 can controlled as above, the sealing between the first member 100 and the second member 200 improves.

In the above, only the first member 100 is rotatable about the rotation axis A and the second member 200 is fixed. However, this sealing structure can be employed to a rotation unit in which the first member 100 and the second member 200 are rotatable relative to each other. Namely, the sealing structure can be employed to a rotation unit in which both of the first member 100 and the second member 200 are rotatable relative to each other about the rotation axis A and a rotation unit in which the second member 200 is rotatable about the rotation axis A and the first member 100 is fixed.

Second Embodiment

Next, a second embodiment of the sealing structure will be described with reference to FIG. 2. Here, like components are denoted by like reference characters and a description thereof is not repeated.

Figure 2:
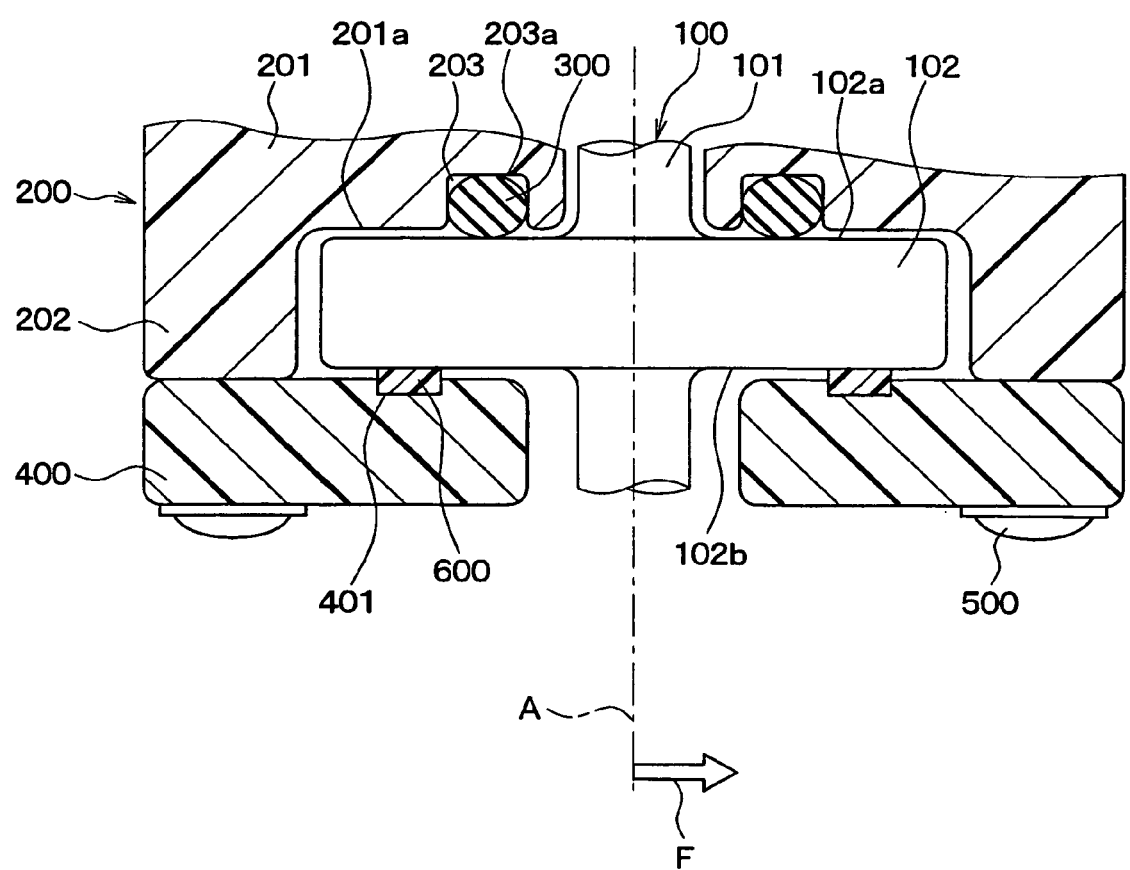
FIG. 2 is a cross-sectional view of a sealing structure of a rotation unit according to a second embodiment of the present invention.

As shown in FIG. 2, the support member 400 is further formed with a groove 401 on its wall opposed to the second surface 102b of the flange portion 102. The groove 401 has a continuous ring shape with a substantially U-shaped cross-section. A sliding resistance reducing member 600 having a thin ring shape is provided in the groove 401. The sliding resistance reducing member 600 is for example made of Teflon®.

Here, the sliding resistance reducing member 600 has an axial dimension larger than a depth of the groove 401. Thus, the sliding resistance reducing member 600 partly projects from the wall of the support member 400 in the axial direction so that the support member 400 contacts the second surface 102b of the flange portion 102 through the sliding resistance reducing member 600. As such, because a coefficient of friction between the support member 400 and the flange portion 102 is reduced, a sliding resistance between them can be reduced.

Alternatively, a groove can be formed on the second surface 102b of the flange portion 102, and the sliding resistance reducing member 600 can be arranged in the groove of the flange portion 102. As another example, one of the wall of the support member 400 and the second surface 102b of the flange portion 102 can be coated by the sliding resistance reducing member.

Third Embodiment

Figure 3:
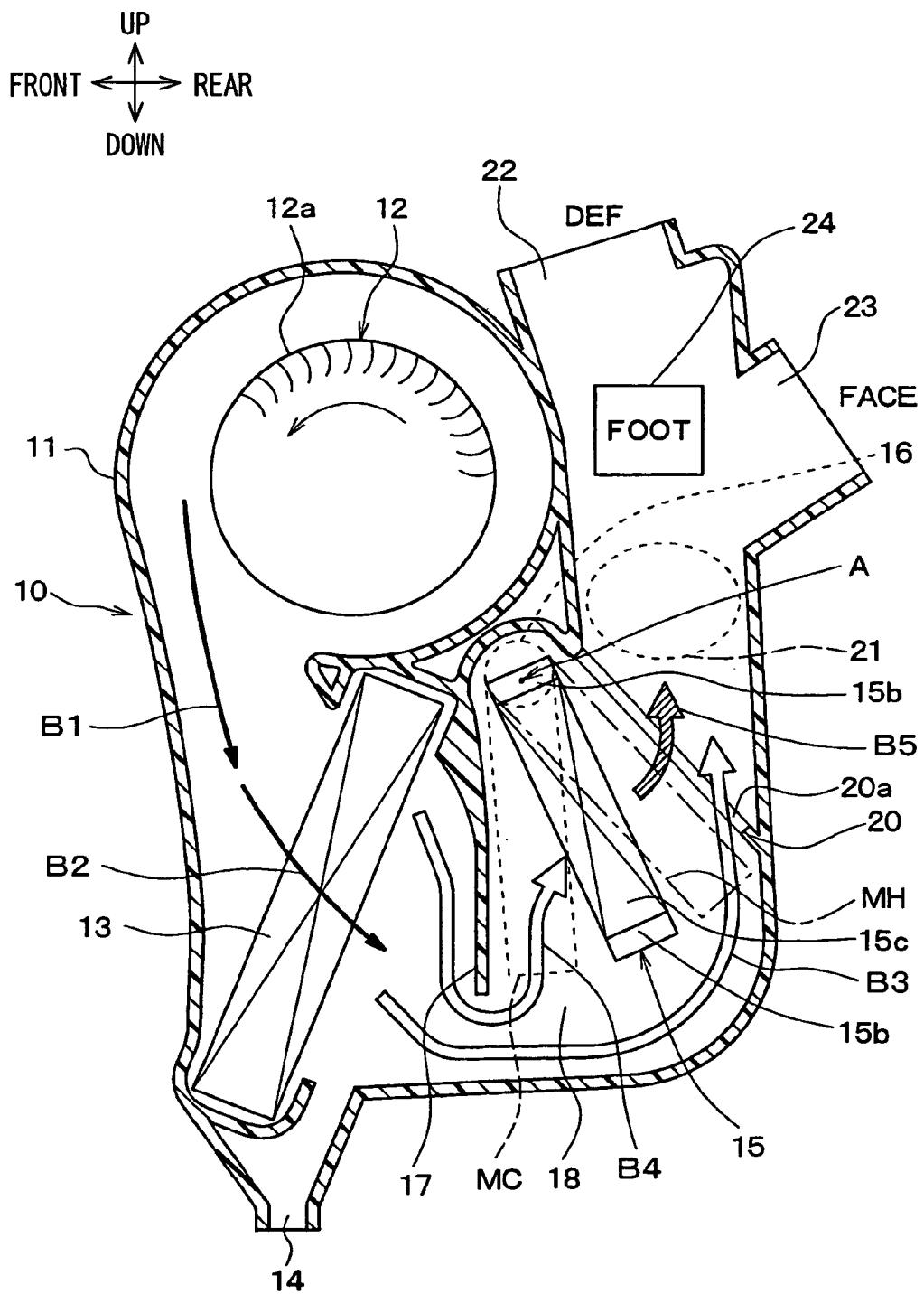
FIG. 3 is a schematic cross-sectional view of an air conditioning unit of an air conditioning apparatus for a vehicle having a rotatable heater core and a coaxial double pipe unit having a sealing structure according to a third embodiment of the present invention.

A third embodiment of the sealing structure will be described with reference to FIGS. 3 to 5. As shown in FIG. 3, the sealing structure is for example employed to an air conditioning unit 10 of a vehicle air conditioner for air-conditioning a passenger compartment of a vehicle.

The air conditioning unit 10 shown in FIG. 3 is for example mounted at a substantially middle position in a vehicle right and left direction in a space defined by an instrument panel at a front part of the passenger compartment. The air conditioning unit 10 is for example arranged in a position as shown by an up and down arrow and a front and rear arrow in FIG. 3. In FIG. 3, a direction perpendicular to a paper plane corresponds to the right and left direction of the vehicle.

The air conditioning unit 10 has an air conditioning case 11 defining an air passage through which air to be introduced into the passenger compartment flows. The air conditioning case 11 is made of a resin. For example, the air conditioning case 11 is constructed by coupling plural case members and fixing them with fixing means such as screws and clips for reasons of molding convenience and assembling convenience of components to be housed therein.

In this air conditioning unit, for example, a blower unit 12 is integrally provided. The air conditioning case 11 houses the blower unit 12 in its front upper location. The blower unit 12 has a centrifugal fan 12a and an electric motor (not shown) for driving the electric fan 12a. Although not illustrated, an inside and outside air switching box is coupled to a suction port of the fan 12a. Thus, the fan 12a draws air (inside air and/or outside air) through the inside and outside air switching box and blows the air into the air passage defined in the air conditioning case 11, as shown by an arrow B1.

In the air conditioning case 11, an evaporator 13 is disposed under the blower unit 12. The evaporator 13 has a thin rectangular parallelepiped outline. The evaporator 13 is disposed to allow the air blown by the fan 12a to fully pass through, as shown by an arrow B2. The evaporator 13 is a cooling heat exchanger of a vapor compression type refrigerating cycle, and a low pressure refrigerant flows inside of the evaporator 13. The evaporator 13 performs heat exchange between the air and the low pressure refrigerant, thereby to cool the air by evaporation of the refrigerant.

The air conditioning case 11 has a drain port 14 at a lowermost position of its bottom wall. The drain port 14 is provided to drain condensed water generated on the evaporator 13 to the outside of the passenger compartment.

Further, a heater core 15 is disposed in the air conditioning case 11 downstream of the evaporator 13 with respect to the flow of air. For example, the heater core 15 is located at a position corresponding to an upper portion of the evaporator 13 on a rear side of the evaporator 13. The heater core 15 is a heating heat exchanger for heating the air having passed through the evaporator 13. Namely, the heater core 15 performs heat exchange between an internal fluid as a heat source fluid and the air having passed through the evaporator 13. Here, a hot water (e.g., engine cooling water) of a hot water circuit of a vehicle engine (not shown) flows inside of the heater core 15 as the internal fluid, for example.

Figure 4:
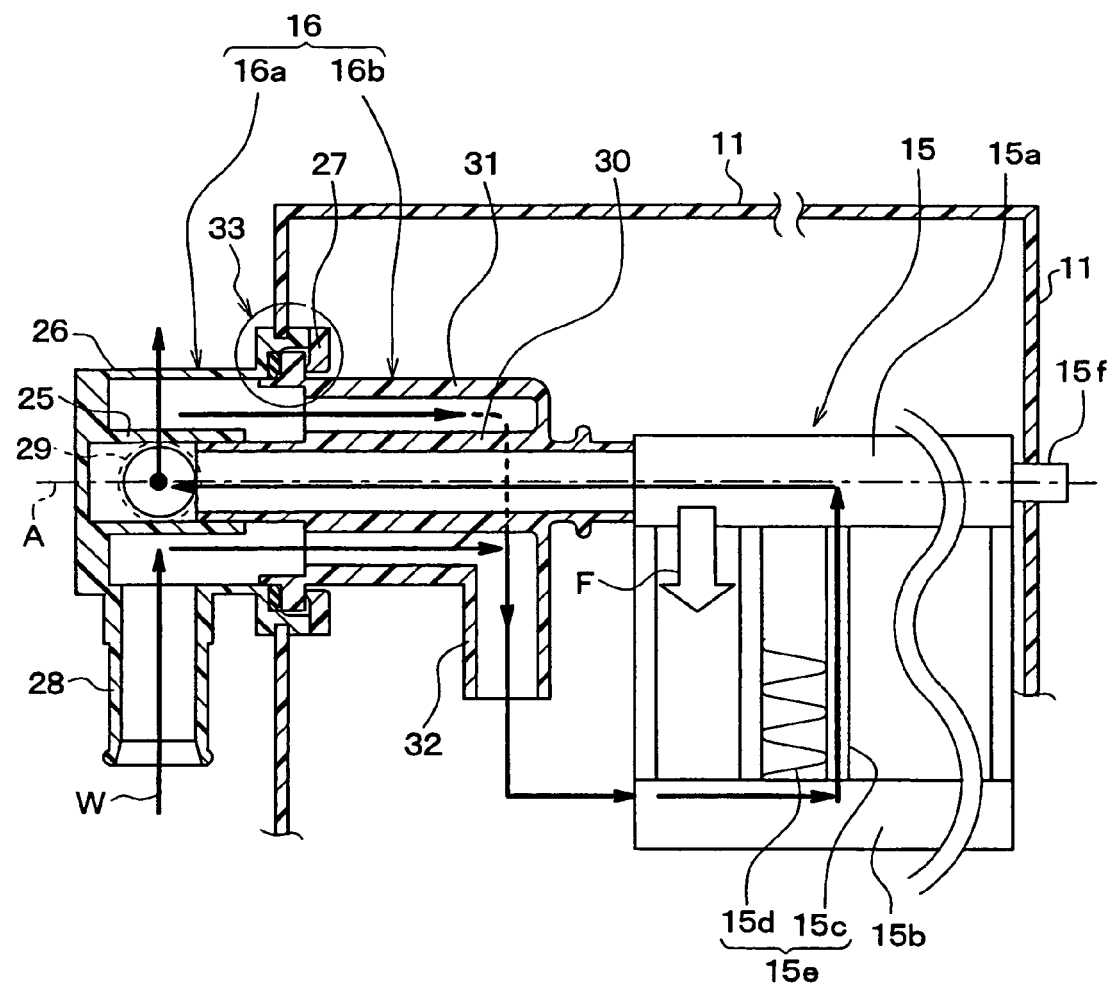
FIG. 4 is a schematic cross-sectional view of the coaxial double pipe unit coupled to the heater core according to the third embodiment.

The heater core 15 is coupled to a coaxial double pipe unit 16 forming two pipes for introducing and discharging the internal fluid into and out of the heater core 15, as shown in FIG. 4. The coaxial double pipe unit 16 is located at a position adjacent to the upper rear end of the evaporator 13. The coaxial double pipe unit 16 defines a rotation axis A, and the heater core 15 is disposed rotatable about the rotation axis A.

The air conditioning case 11 has an air-blocking wall 17 between the evaporator 13 and the heater core 15. The air blocking wall 17 has a generally plate shape, and can be integrally formed into the air conditioning case 11. The air-blocking wall 17 extends vertically downwardly from a position between the upper end of the evaporator 13 and the upper end of the heater core 15.

Further, the air-blocking wall 17 extends across the air conditioning case 11 in the right and left direction. Thus, a right end and a left end of the air-blocking wall 17 connect to side walls of the air conditioning case 11. The air-blocking wall 17 has a size such that an upstream surface (left surface in FIG. 3) of the heater core 15 is fully covered The lower ends of the air-blocking wall 17 and the heater core 15 are spaced from the inner bottom wall of the air conditioning case 11 to define an air passage 18 through which the air having passed through the evaporator 13 flows. The air passage 18 is formed in an area upstream of the heater core 15.

The heater core 15 is rotationally movable between a first position MC shown by a broken line in FIG. 3 and a second position MH shown by a dashed line in FIG. 3. In a maximum cooling operation, the heater core 15 is moved to the first position MC at which the upstream surface of the heater core 15 is fully covered with the air-blocking wall 17. Thus, the air-blocking wall 17 blocks the air having passed through the evaporator 13 from flowing into the heater core 15.

Thus, in the maximum cooling operation, the air having passed through the evaporator 13 fully bypasses the heater core 15 as shown by an arrow B3. Thus, the air passage 18 serves as a heater core bypass passage in the maximum cooling operation.

The air conditioning case 11 has a sealing rib 20 at a position downstream of the heater core 15. The sealing rib 20 is integrally formed with an inner wall of the air conditioning case 11. The sealing rib 20 provides a sealing surface in a maximum heating operation.

The sealing rib 20 projects from the inner wall of the air conditioning case in a form of frame and defines an opening 20a therein for allowing air to pass through. In a maximum heating operation, the heater core 15 is moved to the second position MH such that the periphery of the heater core 15, which is generally rectangular, contacts the sealing rib 20.

Therefore, in the maximum heating operation, the heater core bypass passage, which allows direct communication between the air passage 18 and the opening 20a, is closed. In other words, the flow of the air shown by the arrow B3 is blocked. As such, the cool air having passed through the evaporator 13 is fully directed to the core part of the heater core 15. Accordingly, the maximum cooling operation is performed. The air heated in the heater core 15 passes through the opening 20a, as shown by an arrow B5.

In this air conditioning unit, the temperature of air to be blown into the passenger compartment can be controlled in accordance with a position of the heater core 15, i.e., a rotation angle of the heater core 15. When the heater core 15 is at a position shown by a solid line in FIG. 3, i.e., at a middle position between the first position MC and the second position MH, the air having passed through a lower section of the evaporator 13 is mainly away from the heater core 15 and toward the opening 20a as shown by the arrow B3. Also, the cool air having passed through an upper section of the evaporator 13 is mainly directed to the heater core 15 as shown by an arrow B4 to be heated. Further, the hot air is directed to the opening 20a as shown by the arrow B5.

As such, the volume of air bypassing the heater core 15 and the volume of air passing through the heater core 15 can be controlled by adjusting the position of the heater core 15.

The air conditioning case 11 defines an upper space (air mixing space) 21 downstream of the opening 20a. The cool air bypassing the heater core 15 and the hot air heated by the heater core 15 flow through the opening 20a and are mixed together in the upper space 21. As such, the air mixed in the upper area 21 have a predetermined temperature. The mixed air is introduced to openings 22, 23, 24 defined downstream of the upper space 21.

For example, the openings 22, 23, 24 are located on the rear side of the blower unit 12 in the air conditioning case 11. The opening 22 is formed on a top wall of the air conditioning case 11 as a defroster opening. A defroster duct (not shown) is coupled to the defroster opening 22. The defroster duct connects to a defroster blowing outlet formed on an upper wall of the instrument panel. Thus, the air introduced in the defroster duct from the defroster opening 22 is blown toward an inner surface of a windshield of the vehicle.

The face opening 23 is located more to the rear side of the vehicle than the defroster opening 22. The face opening 23 is separated into a center face opening (not shown) and side face openings (not shown). An end of a center face duct (not shown) is coupled to the center face opening. An opposite end of the center face duct forms a center face blowing outlet at a substantially middle position of the instrument panel in the vehicle right and left direction. Thus, the air introduced in the center face duct from the center face opening is blown toward a passenger face area.

Further, side face ducts are coupled to the side face openings. The side face ducts form side face blowing outlets at right and left ends of the instrument panel. Thus, the air introduced to the side face ducts from the side face openings are blown toward side windows of the vehicle and/or a passenger face area.

The foot openings 24 are formed on the side walls of the air conditioning case 11 for blowing air toward a passenger foot area through foot ducts (not shown). Although not illustrated, the defroster opening 22, the face openings 23 and the foot openings 24 are opened and closed by mode doors.

Next, structure of the coaxial double pipe unit 16 will be described with reference to FIGS. 4 and 5. As shown in FIG. 4, the heater core 15 has an internal fluid discharge tank 15a on its top and an internal fluid introducing tank 15b at its bottom. Hereafter, the internal fluid discharge tank 15a and the internal fluid introducing tank 15b are simply referred to as a first tank 15a and a second tank 15b, respectively.

The heater core 15 further has a core part 15e between the first tank 15a and the second tank 15b. The core part 15c is constructed of a stack of flat tubes 15c and corrugated fins 15d. Here, the heater core 15 is a full-path type heat exchanger, and the internal fluid flows in the core par 15c in one direction.

The tubes 15e are arranged parallel to each other in the right and left direction of the vehicle. The second tank 15b is coupled to the lower end of the core part 15e. The first tank 15a is coupled to the upper end of the core part 15e. The first and second tanks 15a, 15b extend in the direction perpendicular to the tubes 15c. The internal fluid is distributed to the tubes 15e from the second tank 15b and is collected in the first tank 15a after passing through the tubes 15e. As such, the internal fluid flows in the tubes 15e in the same one direction. The air is heated by the heat of the internal fluid while flowing through spaces between the tubes 15a and the fins 15d.

An end of the first tank 15a is coupled to the coaxial double pipe unit 16. An axis of the coaxial double pipe unit 16 is aligned with the rotation axis A of the heater core 15. An opposite end of the first tank 15a is integrated with a shaft portion 15f having a columnar shape. The shaft portion 15f is disposed such that its axis is aligned with the rotation axis A.

The shaft portion 15f is inserted to a hole of the air conditioning case 11 and rotatably supported by the air conditioning case 11.

The end of the shaft portion 15f, on a side opposite to the first tank 15a, is coupled to a driving mechanism on the outside of the air conditioning case 11. The driving mechanism is for example constructed of a link member coupled to the shaft portion 15f, a driving force transmitting member, and a driving member such as a servomotor for transmitting a rotational driving force to the shaft portion 15f through the driving force transmitting member. The shaft portion 15f can be rotated by other means. Also, the driving mechanism can be constructed to be manually operated by a passenger.

The coaxial double pipe unit 16 is mainly constructed of a fixed member 16a and a rotation member 16b, which are in communication with each other. The fixed member 16a is fixed to the air conditioning case 11 by fixing means such as screwing. The rotation member 16b is joined to the heater core 15 and rotatable with the heater core 15 about the rotation axis A. The fixed member 16a is mainly located outside of the air conditioning case 11. The rotation member 16b is located inside of the air conditioning case 11.

The fixed member 16a has a fixed inner pipe 25, a fixed outer pipe 26 and a support member 27. The fixed inner pipe 25 has a cylindrical shape and defines an axis aligned with the rotation axis A. The fixed outer pipe 26 has a cylindrical shape and is located on the outer periphery of the fixed inner pipe 25 with a predetermined space. The support member 27 has a thin disc shape. The fixed inner pipe 25, the fixed outer pipe 26 and the support member 27 are coaxially disposed.

The fixed member 16a further has an inlet pipe 28 and a discharge pipe 29. The inlet pipe 28 connects to the fixed outer pipe 26 for introducing the internal fluid, e.g., the hot water from the engine, into an outer passage defined by the fixed outer pipe 26. The inlet pipe 28 for example extends in a direction perpendicular to the axis of the fixed inner pipe 25.

The discharge pipe 29 connects to the fixed inner pipe 25 for discharging the internal fluid from an inner passage defined in the fixed inner pipe 25. The discharge pipe 29 for example extends in a direction perpendicular to the axis of the fixed inner pipe 25. Also, the discharge pipe 29 extends from the fixed inner pipe 25 to the outside of the fixed outer pipe 26 across the outer passage defined by the fixed outer pipe 26. The fixed inner pipe 25, the fixed outer pipe 26, the inlet pipe 28 and the discharge pipe 29 are integrally formed into a single member with a resin.

On the other hand, the rotation member 16b has a rotation inner pipe 30, a rotation outer pipe 31 and a communication pipe 32. The rotation inner pipe 30 has a cylindrical shape defining an axis aligned with the rotation axis A. The rotation outer pipe 31 has a cylindrical shape and is coaxially disposed on the outer periphery of the rotation inner pipe 30 with a predetermined space.

The communication pipe 32 is in communication with an outer passage defined by the rotation outer pipe 31 and extends from the outer peripheral portion of the rotation outer pipe 31 in a direction perpendicular to the axis of the rotation inner pipe 30. The rotation inner pipe 30, the rotation outer pipe 31 and the communication pipe 32 are integrally formed into a single member with a resin.

The rotation inner pipe 30 is disposed between the fixed inner pipe 25 and the first tank 15a of the heater core 15. For example, a first end of the rotation inner pipe 30 is liquid-tightly and rotatably engaged with an inner wall of the fixed inner pipe 25. As such, the rotation inner pipe 30 and the fixed inner pipe 25 are in communication with each other. A second end of the rotation inner pipe 30 is coupled to the end of the first tank 15a. Thus, the first tank 15a is in communication with the fixed inner pipe 25 through the rotation inner pipe 30.

Further, a first end of the rotation outer pipe 31 is rotatably engaged with an inner wall of the fixed outer pipe 26. As such, the rotation outer pipe 31 is in communication with the fixed outer pipe 26. Further, the communication pipe 32 is in communication with the second tank 15b through a hose (not shown) and the like. The rotation outer pipe 31 corresponds to the first member of the rotation unit and the fixed outer pipe 26 corresponds to the second member of the rotation unit.

As shown by arrows W in FIG. 4, the internal fluid flows in the inlet pipe 28. The internal fluid is introduced to the second tank 15b through the fixed outer pipe 26, the rotation outer pipe 31 and the communication pipe 32. Further, the internal fluid is distributed into the tubes 15c from the second tank 15b, and collected in the first tank 15a.

Then, the internal fluid is introduced to the outlet pipe 29 through the rotation inner pipe 30 and the fixed inner pipe 25, and discharged from the coaxial double pipe unit 16. Accordingly, the fixed outer pipe 26 and the rotation outer pipe 31 define a fluid passage for introducing the internal fluid to the heater core 15. On the other hand, the rotation inner pipe 30 and the fixed inner pipe 25 define a fluid passage through which the internal fluid discharged from the heater core 15 flows.

The coaxial double pipe unit 16 has a sealing part 33 for fluid-tightly sealing the fixed member 16a and the rotation member 16b. A structure of the sealing part 33 will be described with reference to FIG. 5. FIG. 5 is an enlarged cross-sectional view of the sealing part 33 circled in FIG. 4.

Figure 5:
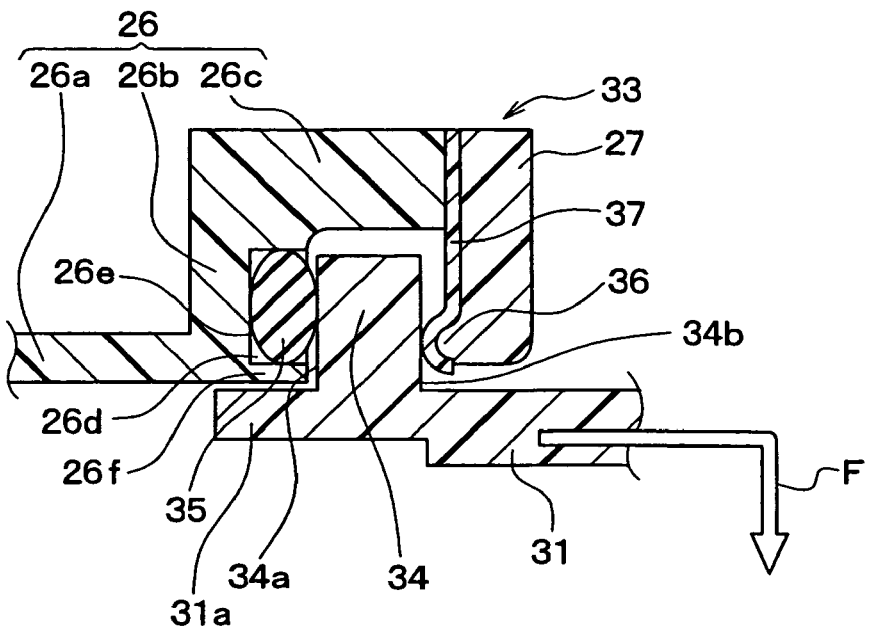
FIG. 5 is an enlarged cross-sectional view of the sealing structure according to the third embodiment.

As shown in FIG. 5, the rotation outer pipe 31 is formed with a flange portion 34. The flange portion 34 expands from an outer wall of the rotation outer pipe 31 in a direction perpendicular to the axis of the rotation member 16b, i.e., the rotation axis A and has a disc shape.

The fixed outer pipe 26 has a pipe portion 26a, a first annular portion 26b and a second annular portion 26c. The pipe portion 26a has cylindrical shape and defines the outer passage through which the internal fluid flows. The first annular portion 26b expands from an end of the pipe portion 26a in a direction perpendicular to the axis of the fixed member 16a as in a form of a flange. The second annular portion 26c extends from an outer peripheral end of the first annular portion 26b in a direction parallel to the axis. The second annular portion 26c has a cylindrical or annular shape.

The first annular portion 26b is opposed to a first surface 34a of the flange portion 34 in the axial direction. The second annular portion 26c is located on the outer periphery of the flange portion 34. The second annular portion 26c surrounds the flange portion 34.

The first annular portion 26b is formed with a groove 26d on a surface opposed to the first surface 34a of the flange portion 34. The groove 26d has a continuous annular shape. The groove 26d has a substantially U-shaped cross-section. An O-ring 35 is arranged in the groove 26d. The O-ring 35 is made of an elastic material such as rubber and has a circular cross-section in its original condition.

The O-ring 35 is in contact with a bottom wall 26e of the groove 26a and the first surface 34a of the flange portion 34 and compressed in the axial direction. Thus, in a cross-section of the O-ring 35 defined in the axial direction, a dimension in the axial direction is smaller than a dimension in a direction perpendicular to the axial direction. As such, the bottom wall 26e and the first surface 34a serve as sealing surfaces to restrict leakage of the internal fluid.

For example, the bottom wall 26e of the groove 26d and the first surface 34a of the flange portion 34 are perpendicular to the axes of the fixed outer pipe 26 and the rotation outer pipe 31. Therefore, even when the axis of the rotation outer pipe 31 is displaced from the axis of the fixed outer pipe 26 due to the force F (e.g., weight of the heater core 15) applied in the direction perpendicular to the rotation axis A, a compression condition of the O-ring 35 will not change. Therefore, it is less likely that the compression ratio of the O-ring 35 will be uneven in its circumferential direction.

Further, the fixed outer pipe 26 has a first cylindrical portion 26f extending from in the axial direction. On the contrary, the rotation outer pipe 31 has a second cylindrical portion 31a extending from an inner peripheral portion of the first surface 34a of the flange portion 34 in the axial direction. The second cylindrical portion 31a has a cylindrical shape and is located on a radially inside of the first cylindrical portion 26f. Namely, the fixed outer pipe 26 and the rotation outer pipe 31 have the portions opposed or overlapping in a direction perpendicular to the axial direction with a predetermined clearance.

As such, when the axis of the rotation outer pipe 31 is displaced from the axis of the fixed outer pipe 26, the second cylindrical portion 31a contacts the first cylindrical portion 26f. Thus, relative displacement of the rotation outer pipe 31 and the fixed outer pipe 26 is reduced or regulated within a predetermined range. In other words, a range of relative movement of the rotation outer pipe 31 and the fixed outer pipe 26 in the direction perpendicular to the rotation axis A is regulated by the first and second cylindrical portions 26f, 31a.

Accordingly, the axis of the rotation outer pipe 31 and the axis of the fixed outer pipe 26 are maintained in substantially alignment. The O-ring 35 will not be compressed in the direction perpendicular to the axis of the fixed outer pipe 26.

Further, a support member 27 is connected to an end of the second annular portion 26c by fixing means such as screws (not shown). The support member 27 has a thin disc shape and is opposed to a second surface 34b of the flange portion 34 in the axial direction.

The flange portion 34 is held between the support member 27 and the first annular portion 26b through the O-ring 35. It is constructed such that the compression ratio of the O-ring 35 is the minimum in a condition that the flange portion 34 contacts the support member 27. In other words, the minimum compression ratio of the O-ring 35 can be controlled by interposing the flange portion 34 between the support member 27 and the first annular portion 26b.

The support member 27 is formed with a projection 36 on the wall opposed to the second surface 34b of the flange portion 34. The projection 36 projects toward the second surface 34b of the flange portion 34 and has a rounded end. Also, the projection 36 has a continuous annular shape. The support member 27 contacts the flange portion 34 through the projection 36. Namely, since a contact area of the support member 27 with the flange portion 34 is small, a sliding resistance between the support member 27 and the flange portion 34 is reduced.

Further, the projection 26 is coated with a sliding resistance reducing material 37 made of such as Teflon®. As such, since a coefficient of friction between the support member 27 and the flange portion 34 is reduced, the sliding resistance between the support member 27 and the flange portion 34 can be further reduced. Instead, the surface of the support member 27, opposed to the flange portion 34, can be entirely coated with the sliding resistance reducing material 37.

Alternatively, the second surface 34b of the flange portion 34 can be coated with the sliding resistance reducing material 37. In stead of coating of the sliding resistance reducing material 37, a sliding resistance reducing member in a form of thin disc and made of a material such as Teflon® can be provided on the surface of the support member 27 or the second surface 34b of the flange portion 34.

In the third embodiment, the internal fluid is introduced in the coaxial double pipe unit 16 and the heater core 15 from the inlet pipe 28. However, the internal fluid can be introduced in the coaxial double pipe unit 16 and the heater core 15 from the outlet pipe 28. Namely, the flow direction W of the internal fluid can be reversed.

Also, in the third embodiment, the rotation inner pipe 30 is received in the fixed inner pipe 25. Alternatively, the rotation inner pipe 30 is engaged with an outer wall of the fixed inner pipe 25.

In the third embodiment, the coaxial double pipe unit 16 and the shaft portion 15f are disposed on one end of the heater core 15, e.g., on the first tank 15a. However, the locations of the coaxial double pipe unit 16 and the shaft portion 15f are not limited to the above. For example, the coaxial double pipe unit 16 and the shaft portion 15f can be disposed at the middle of the heater core 15, i.e., between the first tank 15b and the second tank 15a.

In the third embodiment, the heater core 15 is constructed as a full-path type in which the internal fluid flows through the tubes 15c from one of the first and second tanks 15a, 15b to the other tank as in one direction. However, the heater core 15 is not limited to the full-path type heat exchanger. For example, the heater core 15 can be a U-turn type heat exchanger in which the internal fluid flows from a first end of a core part to a second end, makes U-turn at the second, and flows toward the first end so that a first flow from the first end to the second end and a second flow from the second end to the first end are arranged with respect to the flow direction of air. Also, the heater core 15 can be arranged such that the tubes extend in a horizontal direction.

In the third embodiment, the fixed member 16a is provided as a separate part from the air conditioning case 11. However, since the fixed member 16a and the air conditioning case 11 are both made of resin, the fixed member 16a can be integrally formed with the air conditioning case 11.

In the third embodiment, the internal fluid flowing inside of the heater core 15 is the hot water circulating through the vehicle engine. However, the internal fluid is not limited to the hot water of the engine. For example, the internal fluid can be a hot water heated by a vehicle-mounted heating devices such as a fuel cell and a combustion type heater. Further, the internal fluid can be an oil for operating hydraulic equipment.

Fourth Embodiment

Figure 6:
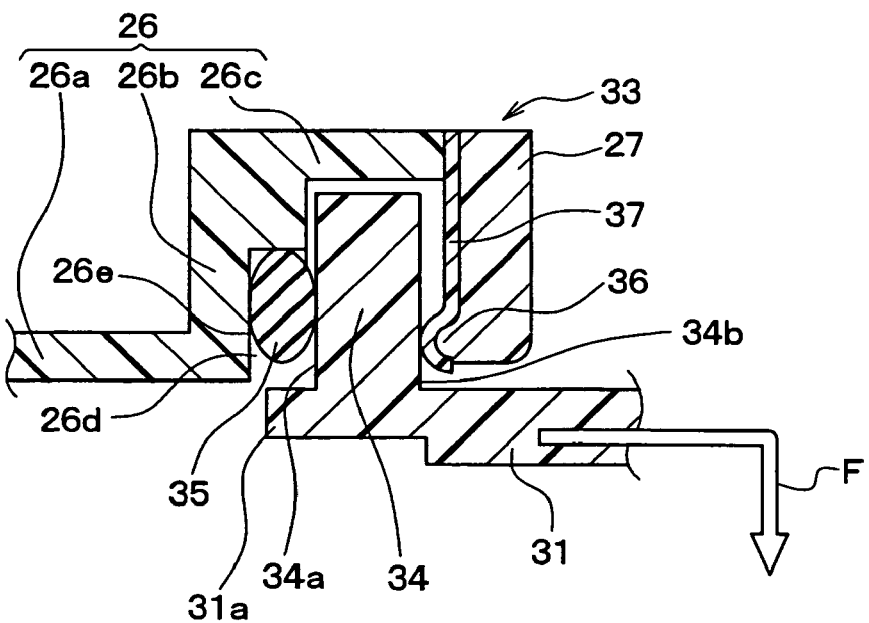
FIG. 6 is a schematic cross-sectional view of a sealing structure of a coaxial double pipe unit for an air conditioning unit according to a fourth embodiment of the present invention.
Figure 7:
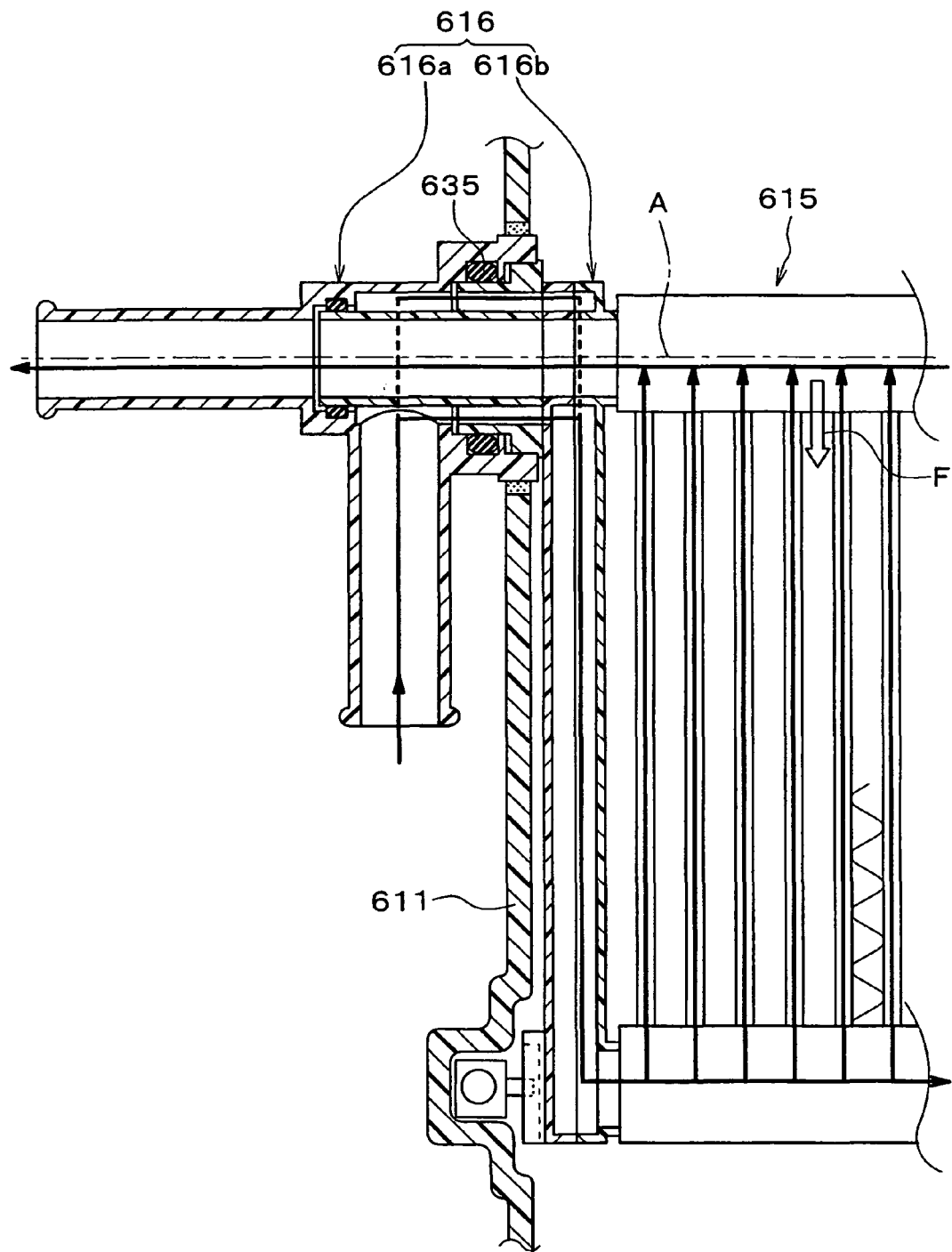
FIG. 7 is a cross-sectional view of an air conditioning unit having a sealing structure as a related art.

Next, a fourth embodiment of the present invention will be described with reference to FIG. 6. Here, components similar to the third embodiment are denoted by like reference characters and a description thereof is not repeated.

In the fourth embodiment, the structure of the sealing part 33 is different from that of the third embodiment. As shown in FIG. 6, the fixed outer pipe 26 does not have the first cylindrical portion 26f. Instead, the outer diameter of the flange portion 34 of the rotation outer pipe 31 is increased so that a clearance between the second annular portion 26c and the flange portion 34 is reduced, as compared with that of the third embodiment.

In this construction, when the axis of the rotation outer pipe 31 is displaced from the axis of the fixed outer pipe 26 due to the load F, the outer periphery of the flange portion 34 contacts the inner wall of the second annular portion 26c. As such, a displacement range of the rotation outer pipe 31 relative to the fixed outer pipe 26 is regulated. Therefore, it is less likely that the O-ring 35 will be compressed in a direction perpendicular to the rotation axis A even when the axis of the rotation outer pipe 31 is displaced from the axis of the fixed outer pipe 26.

In the third and fourth embodiments, the O-ring 35 is disposed on the fixed outer pipe 26. Instead, the O-ring 35 can be disposed on the support member 35. In the third and fourth embodiments, the flange portion 34 of the rotation outer pipe 31 is received in the space defined between the fixed outer pipe 26 and the support member 27. Instead, the fixed outer pipe 26 can have a flange portion and the rotation outer pipe 31 can have a groove for receiving the flange portion of the fixed outer pipe 26 therein.

The example embodiments of the present invention are described above. However, the present invention is not limited to the above embodiments, but may be implemented in other ways without departing from the spirit of the invention.

What is claimed is:

1. An air conditioning apparatus comprising:
a case defining a space through which air flows;
a heat exchanger disposed in the case performing heat exchange between the air and a fluid flowing through the heat exchanger, the heat exchanger being rotatable about a rotation axis;
a pipe unit in communication with the heat exchanger and through which the fluid flows, wherein
the pipe unit has a first section and a second section coaxially coupled, the first section is fixed to the case and the second section is coupled to the heat exchanger and rotatable with the heat exchanger about the rotation axis,
the first section has a first inner pipe portion and a first outer pipe portion, the first outer pipe portion is coaxially disposed on an outer periphery of the first inner pipe portion,
the first outer pipe portion includes a first annular portion, a second annular portion, a cylindrical portion and a support member,
the first annular portion expands from an end of the first outer pipe portion in a direction perpendicular to the rotation axis and has a flange shape,
the second annular portion extends from an outer end of the first annular portion in a direction parallel to the rotation axis,
the cylindrical portion extends from an inner end of the first annular portion in the direction parallel to the rotation axis, the cylindrical portion forms a groove having a continuous annular shape with the first annular portion, the cylindrical portion is located on a radially inner side of the groove,
the support member has a disc shape, the support member is disposed at an end of the second annular portion and opposed to the first annular portion in the direction parallel to the rotation axis,
the second section has a second inner pipe portion and a second outer pipe portion,
the second outer pipe portion is coaxially disposed on an outer periphery of the second inner pipe portion,
the second outer pipe portion includes a flange portion extending in a direction perpendicular to the rotation axis, and
the first section and the second section are coupled such that the first inner pipe portion is in communication with the second inner pipe portion, the first outer pipe portion is in communication with the second outer pipe portion, and the flange portion is disposed between the first annular portion and the support member and surrounded by the second annular portion,
the air conditioning apparatus further comprising:
an O-ring disposed in the groove and in contact with a surface of the first annular portion that forms the groove and the flange portion in the direction parallel to the rotation axis such that the O-ring has a cross-sectional shape in which a dimension of the cross-sectional shape in the direction parallel to the rotation axis is smaller than a dimension of the cross-sectional shape in the direction perpendicular to the rotation axis.

2. The air conditioning apparatus according to claim 1, further comprising:
a sliding resistance reducing member between the flange portion and support member for reducing a sliding resistance therebetween.

3. The air conditioning apparatus according to claim 1, wherein
the support member has a projection projecting toward the flange portion, and the projection has a rounded end.

4. The air conditioning apparatus according to claim 1, wherein
the first section and the second section respectively have a first opposing wall and a second opposing wall extending in a direction parallel to the rotation axis, and
the first opposing wall and the second opposing wall are opposed to each other in a direction perpendicular to the rotation axis with a predetermined clearance to reduce displacement of the second section relative to the first section.

5. The air conditioning apparatus according to claim 4, wherein
the first opposing wall is defined by an inner wall of the second annular portion, and
the second opposing wall is defined by a radial outside wall of the flange portion.

6. The air conditioning apparatus according to claim 4, wherein
the first opposing wall is defined by an inner surface of the cylindrical portion, and the second opposing wall is defined by an outer surface of the second outer pipe portion.

7. The air conditioning apparatus according to claim 1, wherein
the cylindrical portion overlaps with the second outer pipe portion with a predetermined clearance to restrict displacement of the second section relative to the first section within a predetermined range.

* * * * *